R. KRASBERG.
COLLAR FASTENING DEVICE.
APPLICATION FILED JAN. 16, 1909.
1,021,414.
Patented Mar. 26, 1912.
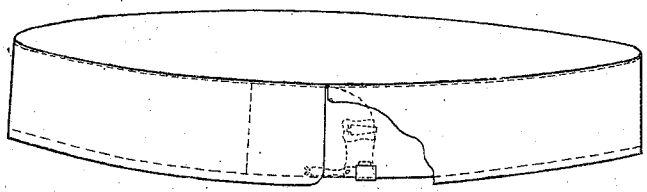
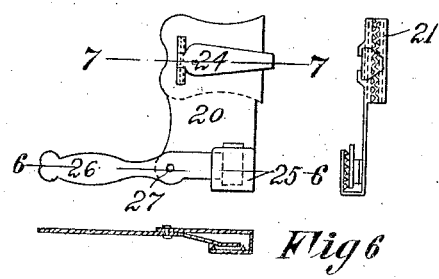
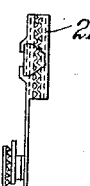
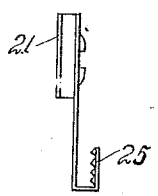
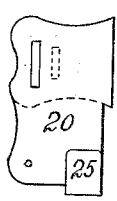
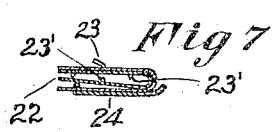
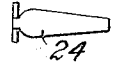
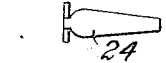
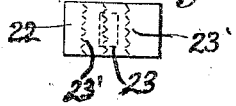
Witnesses:
Louise Enderle
Rudolf Krasberg, Inventor
By his Attorney

UNITED STATES PATENT OFFICE.

RUDOLF KRASBERG, OF POUGHKEEPSIE, NEW YORK.

COLLAR-FASTENING DEVICE.

1,021,414.  Specification of Letters Patent.  Patented Mar. 26, 1912.

Application filed January 16, 1909. Serial No. 472,650.

*To all whom it may concern:*

Be it known that I, RUDOLF KRASBERG, a citizen of the United States, residing at Poughkeepsie, in the county of Dutchess and State of New York, have invented certain new and useful Improvements in Collar-Fastening Devices, of which the following is a specification, reference being had therein to the accompanying drawing.

My invention relates to improvements in devices for holding the collar in proper position around the neck and comprises holding means adapted to retain the two laps on the inside of the collar in such a position that after the collar has been fastened the same will not spread open.

Referring to the accompanying drawings Figure 1 is a front elevation of a collar partly broken away with my device in position showing an application of my invention. Fig. 2 a front elevation of the device. Fig. 3 an end view of Fig. 2. Fig. 4 another end view with parts omitted. Fig. 5 is a front elevation of the body portion of the device, the levers 25 and 26 being omitted. Fig. 6 a cross section on the line 6—6 of Fig. 2. Fig. 7 a cross section looking upwardly on the line 7—7 of Fig. 2. Fig. 8 a plan view of one of the levers, Fig. 9 a side view of same, Fig. 10 a plan view of the other lever, Fig. 11 a side view of same, Fig. 12 a side view of a spring jaw, and Fig. 13 is a plan view of same.

The entire device may be formed of four pieces of metal as illustrated in the drawings or suitable modifications may be made.

20 is the body of the device and is provided at the upper extremity with a projection 21 at one side bent back upon itself forming a lip adapted to receive the spring jaw 22 shown to advantage in Figs. 7, 12 and 13. This spring jaw is held by suitable means such as the prong 23 and is provided with teeth 23'. One side of the jaw is adapted to be forced in the direction of the lip 21 by operating the lever 24 in the usual manner thereby providing a secure and simple form of retaining means. The lower extremity of the main body of the device is formed into a hook 25 into which may be introduced the end of the lever 26 shown on an enlarged scale in Figs. 8 and 9. This lever is pivoted at 27 so that it remains out of engagement with said hook when in its vertical position.

In the application of my invention the lip 21 is preferably slipped over one end of one of the laps of the collar and the lever 24 is pressed into place thereby securely holding the same. The lower extremity of the device is then at about a level with the lower edge of and engages the adjoining lap of the collar and by throwing up the tongue 26, the lower edge of the lap is engaged between the end of the lever 26 and the hook of the device and the two laps are held firmly locked together so that the top of the outside of the collar meets neatly and remains in that position.

Referring again to Fig. 1 it will be observed that the lap from the left side of the collar is held between jaws 22 which are forced together by the lever 24 and that the lever 26 at the lower extremity of the device when turned horizontally beneath the collar securely holds the lower edge of the collar.

Various modifications may be made within the scope of the appended claim without departing from the spirit of the invention.

Having described my invention, what I claim as new, and desire to secure by Letters Patent is:

A collar holding device comprising a body portion provided with fastening means at the top adapted to engage the inner end and hook retaining means at the bottom adapted to engage the lower portion of the outer end of the collar when in position upon the neck, said fastening means comprising a pair of jaws and a hinged lever adapted to operate the same, and said hook retaining means comprising a hook, and a pivoted lever mounted adjacent thereto and adapted to bind said collar therein, the lever of said fastening means and said hook retaining means being upon the same side of said device.

In testimony whereof I affix my signature in presence of two witnesses.

RUDOLF KRASBERG.

Witnesses:
 CHARLES KUHLEN,
 DANIEL H. KRIEGER.